(12) United States Patent
Yamamoto et al.

(10) Patent No.: US 11,783,155 B2
(45) Date of Patent: *Oct. 10, 2023

(54) RFID TAG BOARD, RFID TAG, AND RFID SYSTEM

(71) Applicant: KYOCERA Corporation, Kyoto (JP)

(72) Inventors: Shuichi Yamamoto, Yokohama (JP); Takuya Hayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,973

(22) Filed: Apr. 14, 2022

(65) Prior Publication Data

US 2022/0261611 A1    Aug. 18, 2022

Related U.S. Application Data

(63) Continuation of application No. 17/269,051, filed as application No. PCT/JP2019/032650 on Aug. 21, 2019, now Pat. No. 11,354,557.

(30) Foreign Application Priority Data

Aug. 22, 2018 (JP) ................. 2018-155087

(51) Int. Cl.
*G06K 19/077* (2006.01)

(52) U.S. Cl.
CPC ... *G06K 19/07745* (2013.01); *G06K 19/0779* (2013.01); *G06K 19/07758* (2013.01)

(58) Field of Classification Search
CPC ....... G06K 19/07745; G06K 19/07758; G06K 19/0779

USPC ......................................................... 235/492
See application file for complete search history.

(56) References Cited

U.S. PATENT DOCUMENTS

| | | |
|---|---|---|
| 9,064,198 B2 | 6/2015 | Kato et al. |
| 2013/0004750 A1 | 1/2013 | Majumdar et al. |
| 2013/0004753 A1 | 1/2013 | Majumdar et al. |
| 2015/0255534 A1 | 9/2015 | Yamazaki et al. |
| 2018/0151742 A1 | 5/2018 | Kurata et al. |
| 2018/0218182 A1 | 8/2018 | Sugimoto et al. |
| 2018/0268178 A1 | 9/2018 | Sugimoto et al. |

FOREIGN PATENT DOCUMENTS

WO   2013/145312 A1   10/2013

*Primary Examiner* — Allyson N Trail
(74) *Attorney, Agent, or Firm* — Volpe Koenig

(57) ABSTRACT

An RFID tag board includes an insulating substrate provided with a first surface conductor, a second surface conductor, a short-circuit part through conductor, a capacitance conductor, a capacitance part through conductor, a first electrode and a second electrode. The short-circuit part through conductor electrically connects the first surface conductor and the second surface conductor. The capacitance conductor faces at least part of one of the first and second surface conductors to form a capacitance element. The capacitance part through conductor electrically connects the capacitance conductor and the other one of the first and second surface conductors. First and second conductors of the capacitance element are electrically connected to the first and second electrodes, respectively, not via the short-circuit part through conductor. A distance from the first electrode to the short-circuit part through conductor is shorter than a distance from the second electrode to the short-circuit part through conductor.

11 Claims, 10 Drawing Sheets

US 11,783,155 B2

1

RFID TAG BOARD, RFID TAG, AND RFID SYSTEM

CROSS-REFERENCE TO REFERENCE TO RELATED APPLICATION

This application is a continuation application of U.S. patent application Ser. No. 17/269,051, filed Feb. 17, 2021 which is a 371 National Stage Entry of PCT/JP2019/032650, filed Aug. 21, 2019 which claims priority from Japanese Patent Application No.: 2018-155087, filed Aug. 22, 2018 the disclosure of which is incorporated herein in its entirety by reference.

TECHNICAL FIELD

The present disclosure relates to an RFID (Radio Frequency Identifier) tag board, an RFID tag and an RFID system.

BACKGROUND ART

For the purpose of, for example, article management, an RFID system is used conventionally that transmits and receives information with an RFID tag(s) to and from an article(s) by wireless communication. As the RFID tag, an RFID tag having an RFID tag board provided with an antenna, such as a plate-like inverted-F antenna, and a semiconductor integrated circuit mounted on a plate surface of the RFID tag board is widely used (e.g. WO 2013/145312 A1). Via the antenna of the RFID tag board, the RFID tag can transmit radio waves containing information stored in the semiconductor integrated circuit and also write information contained in received radio waves into the semiconductor integrated circuit. According to an RFID system using such an RFID tag(s), for example, an RFID tag is attached to an article, and a predetermined reader/writer obtains information on the article from the RFID tag or writes necessary information into the RFID tag. Thus, articles can be managed.

SUMMARY OF INVENTION

Solution to Problem

An RFID tag board of an aspect of the present disclosure has a plate surface on which a semiconductor integrated circuit is to be mounted, is used with the plate surface and the semiconductor integrated circuit thereon sealed with a sealing member, and includes:

an insulating substrate one surface of which forms the plate surface;

a first surface conductor that is disposed on the one surface of the insulating substrate;

a second surface conductor that is disposed on a surface of the insulating substrate opposite to the one surface;

a short-circuit part through conductor that passes through the insulating substrate in a thickness direction to electrically connect the first surface conductor and the second surface conductor;

a capacitance conductor that is disposed in the insulating substrate and faces at least part of the first surface conductor or at least part of the second surface conductor to form a capacitance element;

a capacitance part through conductor that is disposed in the insulating substrate to electrically connect the capaci-

2 tance conductor and one of the first surface conductor and the second surface conductor not facing the capacitance conductor;

a first electrode that is disposed on the one surface of the insulating substrate and to which, among terminals that the semiconductor integrated circuit has, a terminal from which a voltage signal relating to a transmission radio wave is output is electrically connected; and a second electrode that is disposed on the one surface of the insulating substrate and to which, among the terminals that the semiconductor integrated circuit has, a terminal serving as a reference potential is electrically connected, wherein a first conductor of a pair of conductors that forms the capacitance element is electrically connected to the first electrode not via the short-circuit part through conductor, and a second conductor of the pair of conductors is electrically connected to the second electrode not via the short-circuit part through conductor, and wherein a distance from the first electrode to the short-circuit part through conductor is shorter than a distance from the second electrode to the short-circuit part through conductor.

An RFID tag of an aspect of the present disclosure includes:

the above RFID tag board;

the semiconductor integrated circuit that is mounted on the plate surface of the RFID tag board; and the sealing member with which the plate surface of the RFID tag board and the semiconductor integrated circuit thereon are sealed.

An RFID system of an aspect of the present disclosure includes:

the above RFID tag; and a reader/writer that transmits and receives a radio wave to and from the RFID tag.

Advantageous Effects of Invention

According to the present disclosure, there is an effect of making a communication distance long.

DESCRIPTION OF EMBODIMENTS

Hereinafter, embodiments of the present disclosure will be described in detail with reference to the drawings.

First Embodiment

Figure 1:
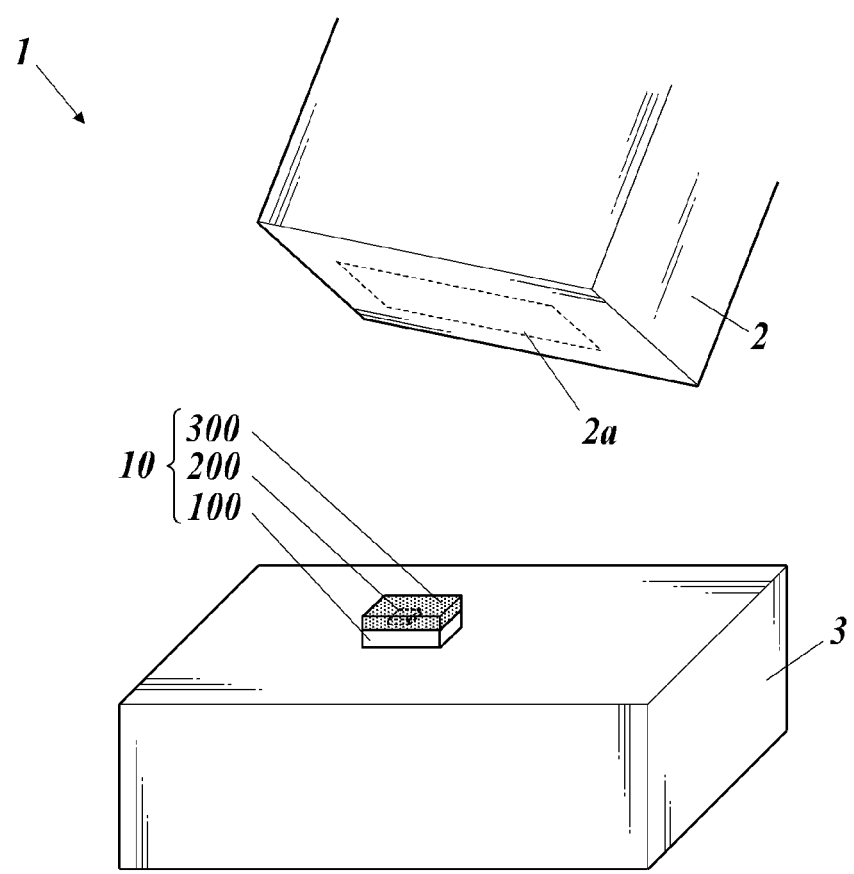
FIG. 1 shows an RFID system.

FIG. 1 shows an RFID system 1 according to a first embodiment of the present disclosure.

The RFID system 1 includes an RFID tag 10 and a reader/writer 2 that transmits and receives radio waves to and from the RFID tag 10.

The RFID tag 10 is used, for example, by being attached to the surface of an article 3 to manage. The RFID tag 10 is a type having no built-in battery, and receives electric power from the reader/writer 2 via electromagnetic waves and operates by this electric power. The RFID tag 10 may be a type having a built-in battery.

The RFID tag 10 includes an RFID tag board 100, an RFID tag IC (Integrated Circuit) 200 (semiconductor integrated circuit) mounted on a plate surface of the RFID tag board 100, and a sealing member 300 for sealing the plate surface, on which the RFID tag IC 200 is mounted, of the RFID tag board 100 and the RFID tag IC 200.

The RFID tag board 100 is a rectangular-parallelepiped-shaped plate-like member in which a plate-like inverted-F antenna is formed. The configuration thereof will be described later in detail.

The RFID tag IC 200 includes a controller that performs control about transmission and reception of radio waves, a storage that stores, for example, information on the article 3, and a feeding terminal 201 (shown in FIG. 3) and a reference potential terminal 202 (shown in FIG. 3) that are electrically connected to the antenna of the RFID tag board 100. Under the control of the controller, the RFID tag IC 200 obtains instruction information contained in radio waves received by the antenna and performs a process corresponding to the instruction information (e.g. rewrites information stored in the storage), and also causes the antenna to transmit (radiate) radio waves containing information specified by the instruction information.

The sealing member 300 covers and protects the RFID tag IC 200. The sealing member 300 is molded such that a structural body composed of the RFID tag board 100 and the sealing member 300 becomes a rectangular parallelepiped as a whole. As the sealing member 300, for example, epoxy resin, polyimide resin, silicone resin or the like is usable. Filler particles, such as silica particles or glass particles, may be added to any of these resin materials. The filler particles are added thereto in order to adjust various characteristics, such as mechanical strength, moisture resistance and electrical characteristics, of the sealing member 300, for example.

The reader/writer 2 has an antenna 2a for transmitting and receiving radio waves to and from the RFID tag 10. The reader/writer 2 transmits, to the RFID tag 10, radio waves containing instruction information instructing the RFID tag 10 to rewrite information or transmit information. Also, the reader/writer 2 receives radio waves transmitted from the RFID tag 10 in accordance with the instruction information, obtains information contained in the radio waves, and performs a predetermined process by using the information (e.g. a process of writing the information into a predetermined storage device or a process of displaying the information on a predetermined display device).

Figure 2A:
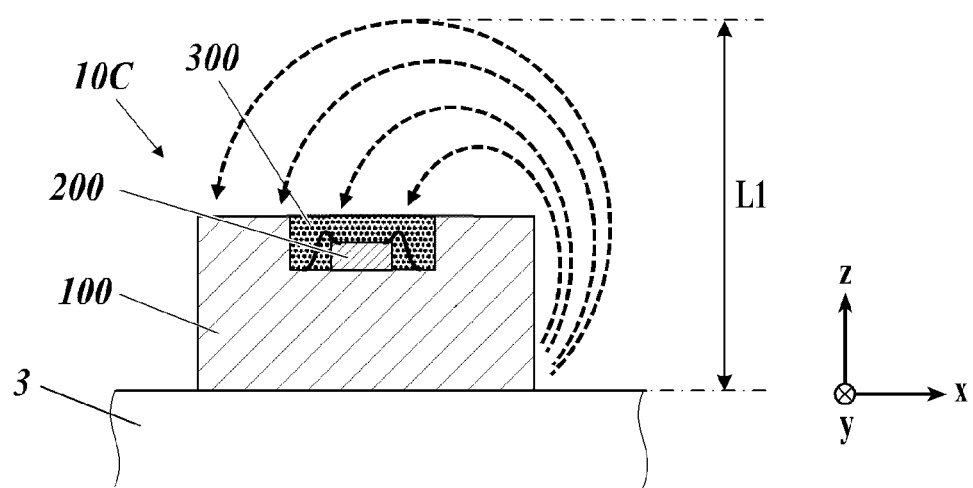
FIG. 2A is a diagram for explaining the radiation state of radio waves due to the structure of an RFID tag.
Figure 2B:
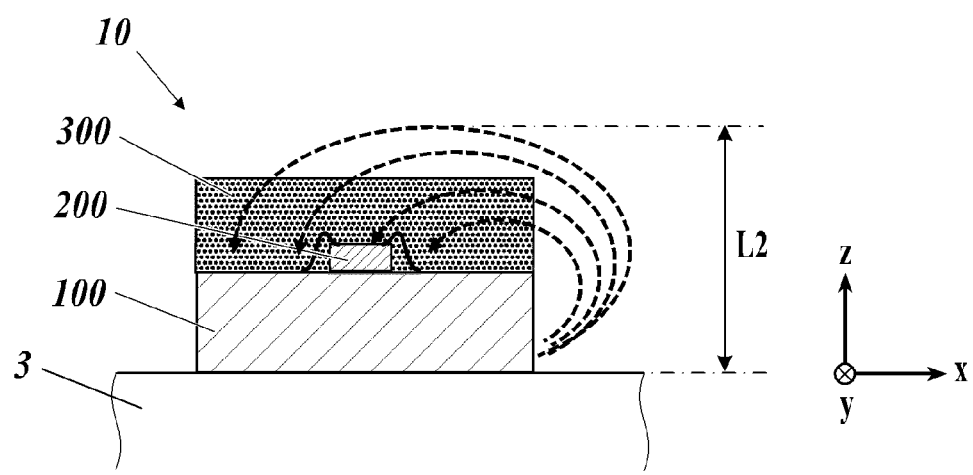
FIG. 2B is a diagram for explaining the radiation state of radio waves due to the structure of an RFID tag.

FIG. 2A and FIG. 2B are each a diagram for explaining the radiation state of radio waves due to the structure of an RFID tag 10.

As RFID tags, there are a cavity-type RFID tag 10C as shown in FIG. 2A and a plate-type RFID tag 10 as shown in FIG. 1 or FIG. 2B. In this embodiment, the plate-type RFID tag 10 is used.

In FIG. 2A and FIG. 2B, a Cartesian coordinate system x, y, z defined fixedly to the RFID tag 10C and the RFID tag 10 is shown. The z direction may be referred to as a height direction of the RFID tag 10C and the RFID tag 10. Herein, the height is merely a designation for the sake of convenience, and hence the height direction herein does not always coincide with the actual height direction (vertical direction) of the RFID tag 10C and the RFID tag 10 when used. The same applies to the Cartesian coordinate system shown in FIG. 3 and the following figures.

In the cavity-type RFID tag 10C shown in FIG. 2A, a recess (cavity) is provided in the upper surface of the RFID tag board 100, the RFID tag IC 200 is mounted on the bottom surface of the recess, and the inside of the recess is sealed with the sealing member 300.

Meanwhile, in the plate-type RFID tag 10 shown in FIG. 2B, as described with reference to FIG. 1, the entire upper surface of the plate-like RFID tag board 100 is sealed with the plate-like sealing member 300. The plate-type RFID tag 10 can be manufactured at lower cost than the cavity-type RFID tag 10C because it does not require a step of forming a recess in the RFID tag board 100, and also can be manufactured efficiently, for example, by a method of forming the sealing member 300 on the entire surface of a compound substrate containing a large number of RFID tag boards 100 and then dividing it.

In each of the cavity-type RFID tag 10C and the plate-type RFID tag 10, radio waves that are transmitted from the RFID tag board 100 radiate from a side surface (one of the surfaces parallel to the yz plane) of the RFID tag board 100 and travel so as to go around in the +z direction. A radio-wave transmittable distance from the mounting surface, on which the RFID tag 10/10C is mounted, of the article 3 in the +z direction depends on the magnitude of electric power received from the reader/writer 2, the size of the RFID tag 10/10C and so forth, but is usually within a range of about several tens of centimeters to several meters.

Radio waves have a property of passing through a substance having a higher permittivity (relative permittivity or relative dielectric constant). Hence, in the plate-type RFID tag 10 shown in FIG. 2B, radio waves radiated from the side surface of the RFID tag board 100 to the outer space are likely to enter, in part, the sealing member 300, and radiate less in a desired direction (+z direction). Meanwhile, in the cavity-type RFID tag 10C shown in FIG. 2A, because the sealing member 300 is embedded in the recess, radio waves are unlikely to enter the sealing member 300, and hardly cause the above problem.

Hence, when RFID tag boards 100 have the same structure (except for the presence or absence of a recess), a radio-wave reaching distance L2 from the plate-type RFID tag 10 in the +z direction tends be shorter than a radio-wave reaching distance L1 from the cavity-type RFID tag 10C in the +z direction. That is, the plate-type RFID tag 10 is likely to have a shorter communication distance than the cavity-type RFID tag 10C has.

To deal with this problem, in the RFID tag 10 of this embodiment, while the plate-type structure is adopted to hold down manufacturing cost, the configuration of the RFID tag board 100 is optimized to make the communication distance longer. Hereinafter, the configuration of the RFID tag 10 of this embodiment will be described with the focus on the structure of the RFID tag board 100.

Figure 3:
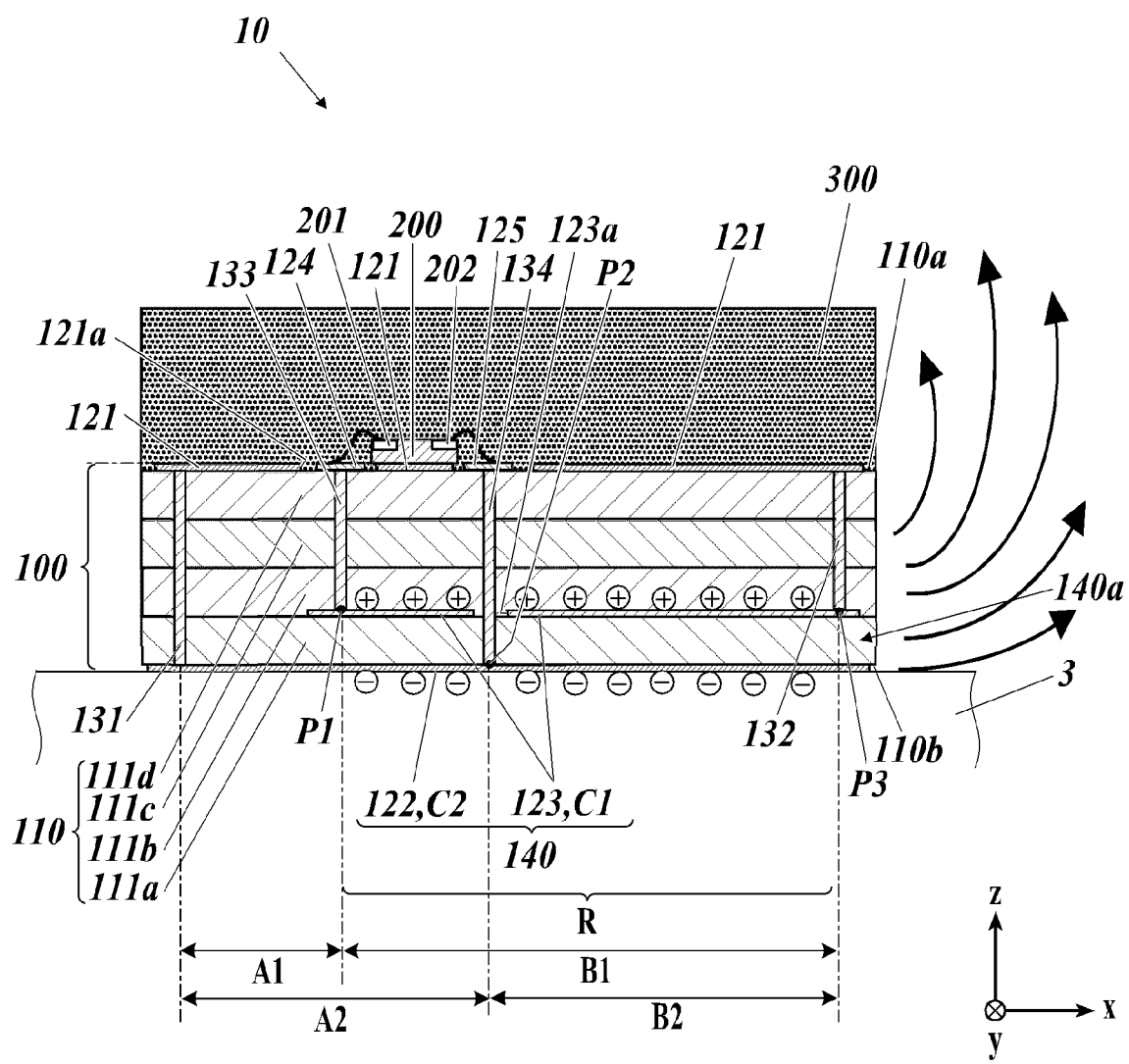
FIG. 3 is a sectional view showing the configuration of an RFID tag of a first embodiment.

FIG. 3 is a sectional view showing the configuration of the RFID tag 10 of this embodiment.

Figure 4:
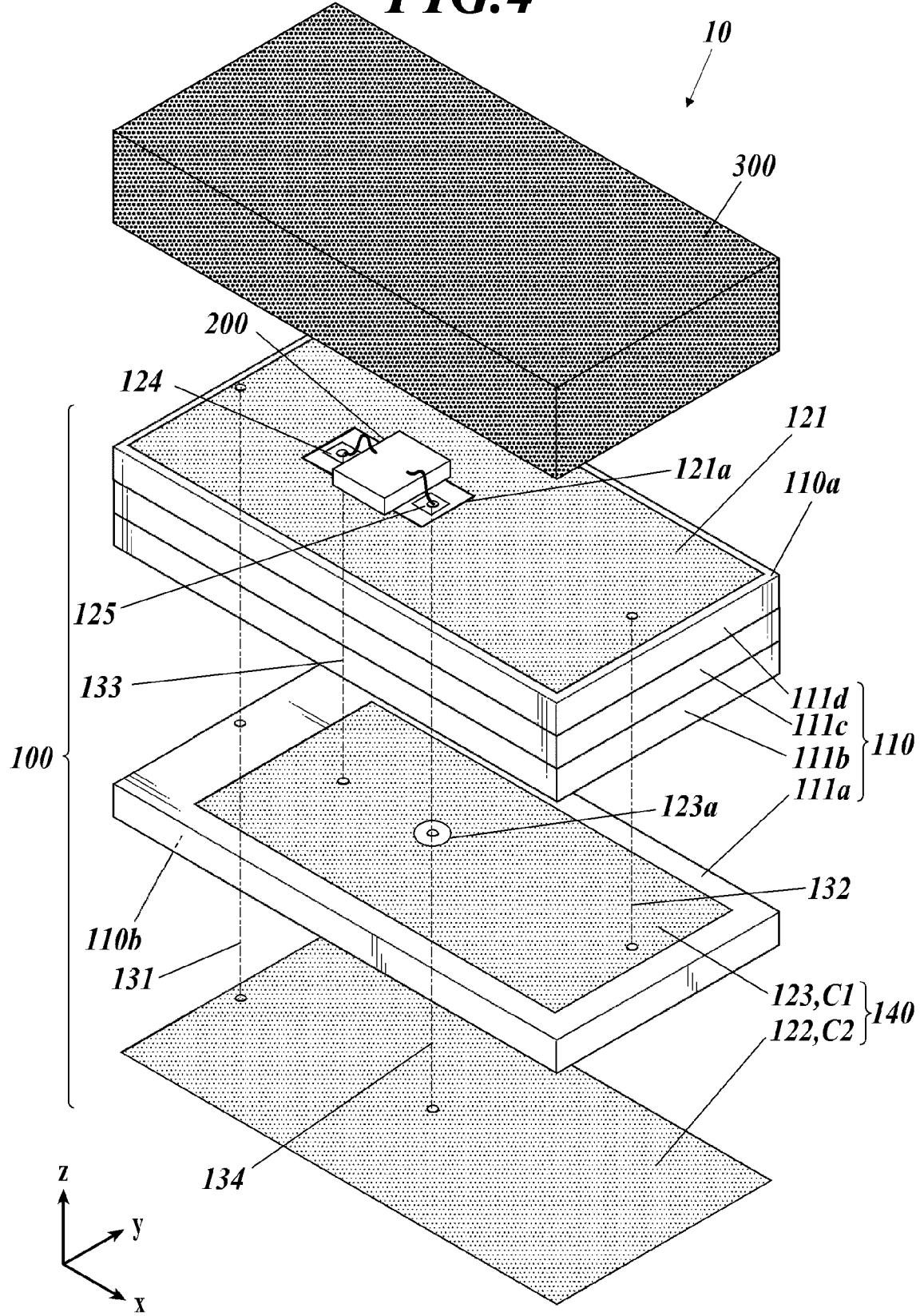
FIG. 4 is an exploded perspective view of the RFID tag shown in FIG. 3.

FIG. 4 is an exploded perspective view of the RFID tag 10 shown in FIG. 3.

As shown in FIG. 3 and FIG. 4, the RFID tag board 100 includes: an insulating substrate 110; an upper surface conductor 121 (first surface conductor), a first electrode 124 and a second electrode 125 disposed on one surface of the insulating substrate 110 (surface facing to the +z direction, which hereinafter may be referred to as an upper surface 110a); a lower surface conductor 122 (second surface conductor) disposed on the opposite surface of the insulating substrate 110 (surface facing to the −z direction, which hereinafter may be referred to as a lower surface 110b) to the one surface; a capacitance conductor 123 disposed in the insulating substrate 110 and facing part of the lower surface conductor 122 to form a capacitance element 140 (capacitor) together with the lower surface conductor 122; a short-circuit part through conductor 131 passing through the insulating substrate 110 in the thickness direction and electrically connecting the upper surface conductor 121 and the lower surface conductor 122; a capacitance part through conductor 132 disposed in the insulating substrate 110 and electrically connecting the capacitance conductor 123 and the upper surface conductor 121; an interlayer through conductor 133 (first interlayer through conductor) disposed in the insulating substrate 110 and electrically connecting the first electrode 124 and the capacitance conductor 123; and an interlayer through conductor 134 (second interlayer through conductor) passing through the insulating substrate 110 in the thickness direction and electrically connecting the second electrode 125 and the lower surface conductor 122.

The RFID tag board 100 is attached and fixed to the article 3 such that the lower surface 110b (lower surface conductor 122) of the insulating substrate 110 faces the article 3. The RFID tag 10 of this embodiment operates even when the surface of the article 3 is formed of a conductor, such as metal. That is, when the RFID tag board 100 is attached to such an article 3, the conductive portion of the article 3 also functions as a ground conductor of the antenna of the RFID tag 10.

The RFID tag IC 200 is mounted on the upper surface of the insulating substrate 110. The upper surface of the insulating substrate 110 and the RFID tag IC 200 thereon are covered and sealed with the sealing member 300. That is, the upper surface of the insulating substrate 110 constitutes the above-described plate surface, on which the RFID tag IC 200 is mounted and which is sealed with the sealing member 300, of the RFID tag board 100.

The insulating substrate 110 is a plate-like member having a structure in which two or more (four in this embodiment) stacking substrates 111a to 111d formed of a dielectric (ceramic in this embodiment) are stacked in this order from the bottom. The insulating substrate 110 has the upper surface 110a and the lower surface 110b that are parallel to the xy plane, and is a rectangular parallelepiped the height (length in the z direction) of which is shorter than the width dimension (length in the x direction) and the depth dimension (length in the y direction), and the width dimension of which is longer than the depth dimension, thereby being long in the x direction. The stacking substrates 111a to 111d constituting the insulating substrate 110 may be formed of, for example, a dielectric, such as an aluminum oxide sintered body, an aluminum nitride sintered body, a mullite sintered body or a glass-ceramic sintered body. The insulating substrate 110 may be formed by stacking two or more (four in this embodiment) sheet-shaped layers (four layers in this embodiment) of ceramic green sheets on top of one another and then firing/sintering these.

On the upper surface 110a of the insulating substrate 110, the first electrode 124 and the second electrode 125 that are rectangular when viewed in the +z direction are disposed. The shape of the first electrode 124 and the second electrode 125 is not limited to a rectangle, and may be another polygon, a circle or the like.

The first electrode 124 is electrically connected via a bonding wire to, among terminals that the RFID tag IC 200 has, the feeding terminal 201 from which a voltage signal(s) relating to transmission radio waves is output. The first electrode 124 is disposed on the −x direction side as compared with the second electrode 125.

The second electrode 125 is electrically connected via a bonding wire to, among the terminals that the RFID tag IC 200 has, the reference potential terminal 202 that serves as a reference potential. The reference potential of this embodiment is a ground potential, and the reference potential terminal 202 is a ground terminal. The reference potential is not limited to the ground potential, and a predetermined potential other than the ground potential may be used as the reference potential.

The method of connecting the first electrode 124 and the second electrode 125 to the above-described terminals of the RFID tag IC 200 is not limited to the method using bonding wires, and they may be connected, for example, by flip chip mounting.

On the upper surface 110a of the insulating substrate 110, the upper surface conductor 121 is disposed. The upper surface conductor 121 is a plate-like conductor that is long in the x direction, and is disposed on almost the entire upper surface 110a of the insulating substrate 110 except a region where the first electrode 124 and the second electrode 125 are formed. That is, the upper surface conductor 121 has a shape having an opening 121a for ensuring the region where the first electrode 124 and the second electrode 125 are formed.

The lower surface conductor 122 is a plate-like conductor that is long in the x direction, and is disposed on almost the entire lower surface 110b of the insulating substrate 110.

The capacitance conductor 123 is a plate-like conductor disposed between the lowermost stacking substrate 111a and the second lowermost stacking substrate 111b of the insulating substrate 110, and faces part of the lower surface conductor 122 to form the capacitance element 140. That is, when a pair of conductors forming the capacitance element 140 is a first conductor C1 and a second conductor C2, the first conductor C1 on the +z direction side is constituted by the capacitance conductor 123, and the second conductor C2 on the −z direction side is constituted by the lower surface conductor 122. The capacitance conductor 123 has a circular opening 123a for allowing the interlayer through conductor 134 to pass through. The opening 123a is formed with a size that ensures a clearance of a predetermined distance from the interlayer through conductor 134.

The upper surface conductor 121, the lower surface conductor 122, the capacitance conductor 123, the first electrode 124 and the second electrode 125 can be formed by, at a stage where the stacking substrates 111a to 111d are ceramic green sheets, printing metal paste at their positions on the ceramic green sheets by screen printing or another method, and firing these together. More specifically, first, metal paste for the lower surface conductor 122 is printed on the lower surface of a ceramic green sheet for the stacking substrate 111a, and metal paste for the capacitance conductor 123 is printed on the lower surface of a ceramic green sheet for the stacking substrate 111b. Alternatively, metal paste for the capacitance conductor 123 may be printed on the upper surface of a ceramic green sheet for the stacking substrate 111a, and metal paste for the lower surface conductor 122 may be printed on the lower surface thereof. In addition, metal paste for the upper surface conductor 121, the first electrode 124 and the second electrode 125 is printed on the upper surface of a ceramic green sheet for the stacking substrate 111d. Next, the four ceramic green sheets for the stacking substrates 111a to 111d are stacked and then fired as a whole. Thus, the upper surface conductor 121, the lower surface conductor 122, the capacitance conductor 123, the first electrode 124 and the second electrode 125 can be formed on/in the insulating substrate 110.

As the metal paste, for example, a mixed material of copper powder with an organic solvent and an organic binder is usable. The exposed surfaces of the upper surface conductor 121, the lower surface conductor 122, the first electrode 124 and the second electrode 125 may be coated with plating layers formed of, for example, nickel, cobalt, palladium or gold. This can inhibit oxidation corrosion. The first electrode 124 and the second electrode 125 coated with a plating layer(s) also improve their joining characteristics with the bonding wires.

The short-circuit part through conductor 131 passes through layers between the upper surface 110a and the lower surface 110b of the insulating substrate 110 in the z direction to electrically connect the upper surface conductor 121 and the lower surface conductor 122. The short-circuit part through conductor 131 is disposed at the end part on the −x direction side in the longer direction (x direction) of the insulating substrate 110. Hence, the short-circuit part through conductor 131 is connected to the end parts on the −x direction side in the longer direction (x direction) of the upper surface conductor 121 and the lower surface conductor 122. An end part in the longer direction of the insulating substrate 110 is, for example, a region having a length of 10% or less of the length of the insulating substrate 110 in the longer direction from an end in the longer direction. The short-circuit part through conductor 131 has widths in the x direction and the y direction narrower than each of the upper surface conductor 121 and the lower surface conductor 122 has, and is pin-shaped in this embodiment.

The capacitance part through conductor 132 is disposed in layers of the insulating substrate 110 between the upper surface conductor 121 and the capacitance conductor 123 (i.e. passes through the stacking substrates 111b to 111d in the z direction) to electrically connect the upper surface conductor 121 and the capacitance conductor 123. The capacitance part through conductor 132 is disposed at the end part on the +x direction side in the longer direction of the insulating substrate 110. Hence, the capacitance part through conductor 132 is connected to the end parts on the +x direction side in the longer direction of the upper surface conductor 121 and the capacitance conductor 123. Similarly to the short-circuit part through conductor 131, the capacitance part through conductor 132 has widths in the x direction and the y direction narrower than each of the upper surface conductor 121 and the lower surface conductor 122 has, and is pin-shaped in this embodiment.

Figure 5:
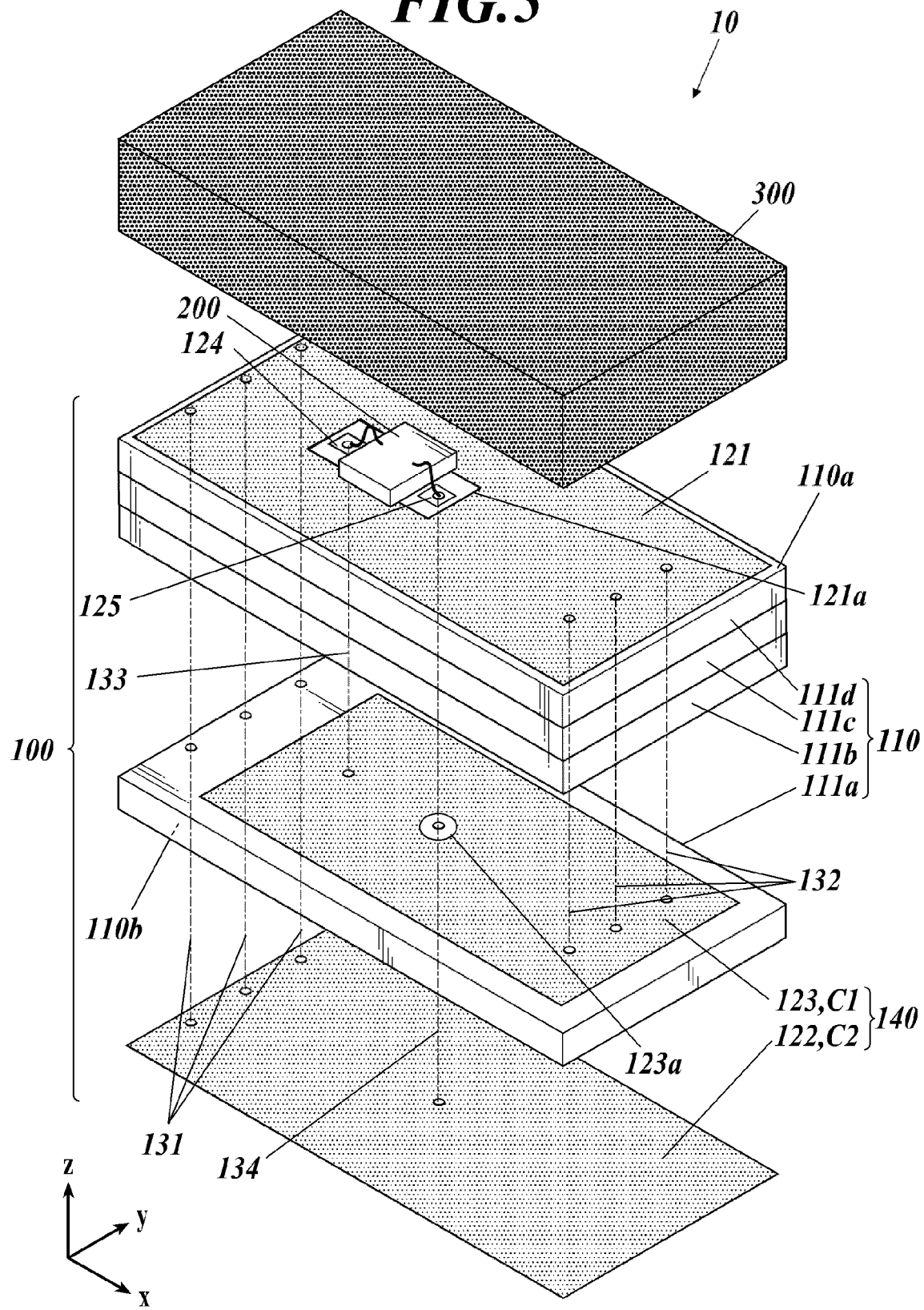
FIG. 5 is an exploded perspective view showing another aspect of the RFID tag of the first embodiment.

In the RFID tag 10 shown in FIG. 3 and FIG. 4, one short-circuit part through conductor 131 and one capacitance part through conductor 132 are provided. However, as shown in FIG. 5, a plurality of short-circuit part through conductors 131 may be disposed at the end part on the −x direction side of the insulating substrate 110, and a plurality of capacitance part through conductors 132 may be disposed at the end part on the +x direction side of the insulating substrate 110. Alternatively, for only one of the short-circuit part through conductor 131 and the capacitance part through conductor 132, a plurality of conductors may be provided.

The interlayer through conductor 133 is disposed in layers of the insulating substrate 110 between the first electrode 124 and the capacitance conductor 123 (i.e. passes through the stacking substrate 111b to 111d in the z direction) to electrically connect the first electrode 124 and the capacitance conductor 123. The interlayer through conductor 133 is disposed so as to be superposed on the first electrode 124 when viewed in the z direction.

The interlayer through conductor 134 passes through layers between the upper surface 110a and the lower surface 110b of the insulating substrate 110 in the z direction to electrically connect the second electrode 125 and the lower surface conductor 122. The interlayer through conductor 134 is disposed so as to be superposed on the second electrode 125 when viewed in the z direction. Also, the interlayer through conductor 134 is disposed so as to pass through the opening 123a of the capacitance conductor 123.

Similarly to the short-circuit part through conductor 131, the interlayer through conductors 133, 134 each have widths in the x direction and the y direction narrower than each of the upper surface conductor 121 and the lower surface conductor 122 has, and are pin-shaped in this embodiment.

The short-circuit part through conductor 131, the capacitance part through conductor 132 and the interlayer through conductors 133, 134 can be formed by, at a stage where the stacking substrates 111a to 111d are ceramic green sheets, the stage being before metal paste is printed to form the upper surface conductor 121 and so forth, providing through holes or interlayer holes in the ceramic green sheets, filling the holes with the metal paste, and firing these together. As the metal paste, as with the material for the upper surface conductor 121, for example, a mixed material of copper powder with an organic solvent and an organic binder is usable.

In thus-configured RFID tag board 100, the upper surface conductor 121, the lower surface conductor 122, the capacitance conductor 123, the short-circuit part through conductor 131, the capacitance part through conductor 132 and the interlayer through conductors 133, 134 constitute the plate-like inverted-F antenna. A chain of conductors constituted by the upper surface conductor 121, the capacitance conductor 123 and the capacitance part through conductor 132 acts as a radiation conductor of the plate-like inverted-F antenna, and the lower surface conductor 122 acts as a ground conductor (which may be referred to as a ground plane or a reference potential conductor) of the plate-like inverted-F antenna. The short-circuit part through conductor 131 acts as an electrical wall of the plate-like inverted-F antenna, the interlayer through conductor 133 acts as a feeder of the plate-like inverted-F antenna, and the interlayer through conductor 134 acts as a ground of the plate-like inverted-F antenna.

As shown in FIG. 3, in this plate-like inverted-F antenna, radio waves mainly radiate from an open end part 140a on the +x direction side of the pair of the conductors of the capacitance element 140. After radiating to the +x direction side, the radio waves travel so as to go around to the +z direction side.

A plate-like inverted-F antenna electrically corresponds to a patch antenna having a shape in which a radiation conductor and a short-circuit conductor on the +x direction side of an electrical wall extend to the other side (−x direction side) of the electrical wall, with the electrical wall as an axis of symmetry. That is, according to the configuration of a plate-like inverted-F antenna in which a radiation conductor and a short-circuit conductor are connected by an electrical wall, the area thereof can be reduced by half the area of a patch antenna having the same function. The plate-like inverted-F antenna of this embodiment has a wavelength shortening effect by part (capacitance conductor 123) of the radiation conductor and part of the short-circuit conductor (lower surface conductor 122) forming the capacitance element 140. This also contributes to miniaturization.

Hereinafter, on the radiation conductor of the plate-like inverted-F antenna, a point where electrical connection with the first electrode 124 is performed is referred to as a connection point P1. In this embodiment, the connection point P1 is a point where the capacitance conductor 123 and the interlayer through conductor 133 are connected (electrical connection point on the capacitance conductor 123 with the first electrode 124). The interlayer through conductor 133 extends from the first electrode 124 in the −z direction, and hence in the x direction and the y direction, the connection point P1 is the same as the position of the first electrode 124.

Hereinafter, on the ground conductor of the plate-like inverted-F antenna, a point where electrical connection with the second electrode 125 is performed is referred to as a connection point P2. In this embodiment, the connection point P2 is a point where the lower surface conductor 122 and the interlayer through conductor 134 are connected (electrical connection point on the lower surface conductor 122 with the second electrode 125). The interlayer through conductor 134 extends from the second electrode 125 in the −z direction, and hence in the x direction and the y direction, the connection point P2 is the same as the position of the second electrode 125.

In the RFID tag board 100 of this embodiment, as described above, the first electrode 124 is disposed on the −x direction side as compared with the second electrode 125. Hence, the connection point P1 is located on the −x direction side as compared with the connection point P2.

Because the first electrode 124 and the second electrode 125 have the above-described positional relationship, a distance A1 between the first electrode 124 and the short-circuit part through conductor 131 is shorter than a distance A2 between the second electrode 125 and the short-circuit part through conductor 131. In other words, the distance A1 between the connection point P1 and the short-circuit part through conductor 131 is shorter than the distance A2 between the connection point P2 and the short-circuit part through conductor 131.

Also, a distance B1 between the first electrode 124 and the capacitance part through conductor 132 is longer than a distance B2 between the second electrode 125 and the capacitance part through conductor 132. In other words, the distance B1 between the connection point P1 and the capacitance part through conductor 132 is longer than the distance B2 between the connection point P2 and the capacitance part through conductor 132.

In the plate-like inverted-F antenna of the RFID tag board 100, during operation of the antenna, current mainly flows, of the first conductor C1 (capacitance conductor 123) of the capacitance element 140, in a section R that is from the connection point P1 with the interlayer through conductor 133 (feeder) to a connection point with the capacitance part through conductor 132 (which is hereinafter referred to as a connection point P3). Hence, in this section R, charges having the opposite polarities accumulate on the first conductor C1 and the second conductor C2 of the capacitance element 140. FIG. 3 shows that positive charges accumulate on the first conductor C1 and negative charges accumulate on the second conductor C2. However, because AC voltage signals are output from the feed terminal of the RFID tag IC 200, the polarities of charges that accumulate on the capacitance element 140 are reversed from those shown in FIG. 3 depending on the period of time.

In the RFID tag board 100 of this embodiment, the connection point P1 is closer to the short-circuit part through conductor 131 than the connection point P2 is. This can ensure a longer section R. Advantages of this configuration will be described in comparison with the configuration of an RFID tag board 100r of a comparative example.

Figure 6:
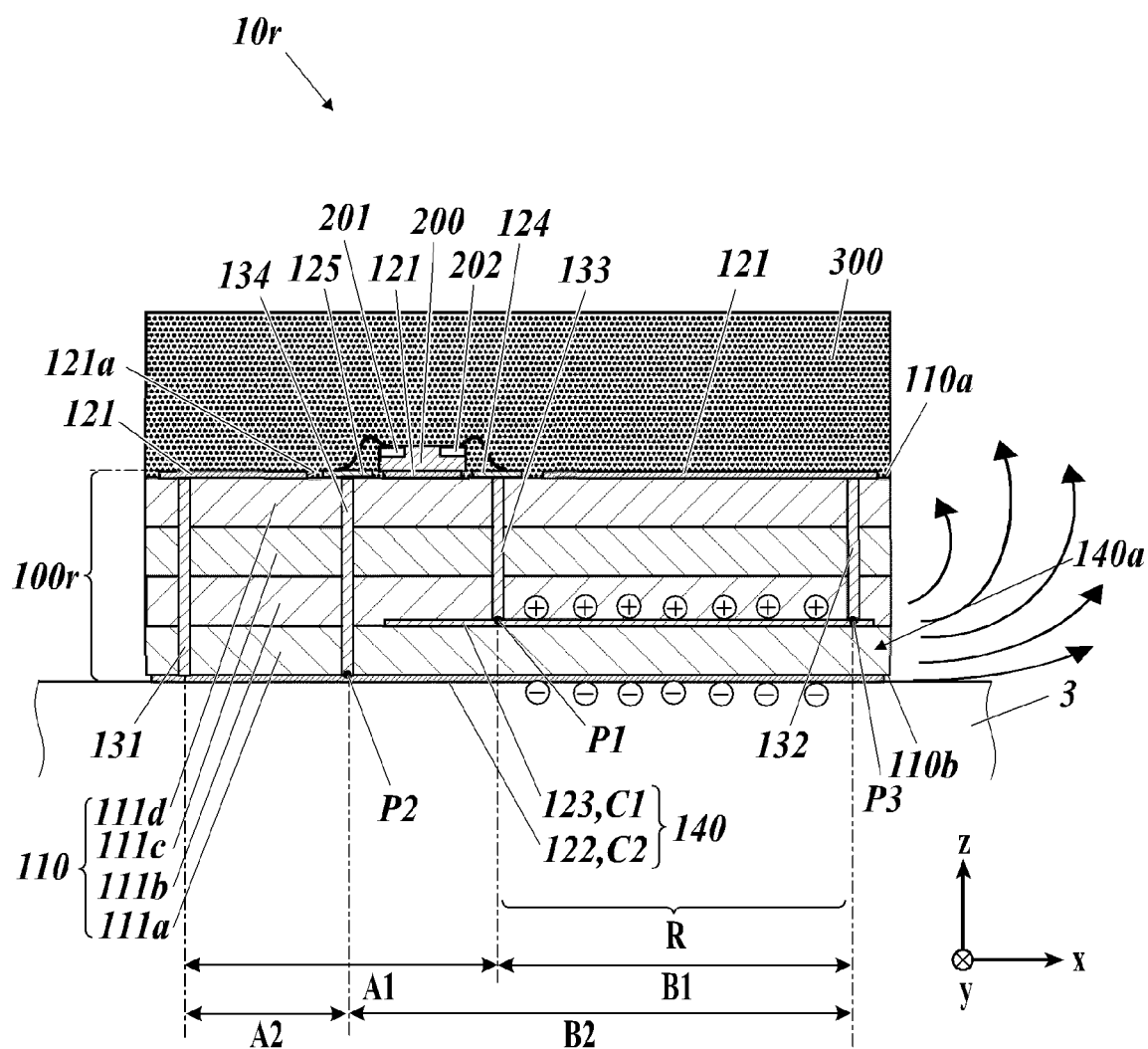
FIG. 6 is a sectional view showing the configuration of an RFID tag board of a comparative example.

FIG. 6 is a sectional view showing the configuration of the RFID tag board 100r of the comparative example.

In the RFID tag board 100r of this comparative example, the positional relationship in the x direction between the first electrode 124 and the second electrode 125 is reversed from that in the RFID tag board 100 shown in FIG. 3. Hence, the positional relationship in the x direction between the interlayer through conductor 133 (feeder) and the interlayer through conductor 134 (ground) is also reversed from that in the RFID tag board 100 shown in FIG. 3. As a result, the distance A1 between the connection point P1 and the short-circuit part through conductor 131 is longer than the distance A2 between the connection point P2 and the short-circuit part through conductor 131. Also, the distance B1 between the connection point P1 and the capacitance part through conductor 132 is shorter than the distance B2 between the connection point P2 and the capacitance part through conductor 132.

In thus-configured RFID tag board 100r of the comparative example, the section R from the connection point P1 to the connection point P3, in which current flows during operation of the antennas, is shorter than the section R in the RFID tag board 100 shown in FIG. 3. Hence, charges accumulate less on the capacitance element 140.

Conversely, in the RFID tag board 100 of the embodiment shown in FIG. 3, the section R, in which charges accumulate, of the capacitance element 140 is longer than the section R in the RFID tag board 100r of the comparative example shown in FIG. 6. Thus, as compared with the comparative example, more charges accumulate on the capacitance element 140, and the potential difference generated between the conductors, which are a pair of conductors, of the capacitance element 140 can be larger. As a result, stronger radio waves are emitted from the plate-like inverted-F antenna, and hence a radio wave transmission distance, namely, the communication distance, can be longer.

<Effects of Embodiment>

As described above, the RFID tag board 100 has a plate surface on which the RFID tag IC 200 is to be mounted, is used with the plate surface and the RFID tag IC 200 thereon sealed with the sealing member 300, and includes: the insulating substrate 100 one surface of which forms the plate surface; the upper surface conductor 121 that is disposed on the one surface of the insulating substrate 110; the lower surface conductor 122 that is disposed on the surface of the insulating substrate 110 opposite to the one surface; the short-circuit part through conductor 131 that passes through the insulating substrate 110 in the thickness direction to electrically connect the upper surface conductor 121 and the lower surface conductor 122; the capacitance conductor 123 that is disposed in the insulating substrate 110 and faces at least part of the lower surface conductor 122 to form the capacitance element 140; the capacitance part through conductor 132 that is disposed in the insulating substrate 110 to electrically connect the capacitance conductor 123 and the upper surface conductor 121; the first electrode 124 that is disposed on the one surface of the insulating substrate 110 and to which, among terminals that the RFID tag IC 200 has, a terminal from which a voltage signal(s) relating to a transmission radio wave(s) is output is electrically connected; and the second electrode 125 that is disposed on the one surface of the insulating substrate 110 and to which, among the terminals that the RFID tag IC 200 has, a terminal serving as a reference potential is electrically connected, wherein the first conductor C1 (capacitance conductor 123) of a pair of conductors that forms the capacitance element 140 is electrically connected to the first electrode 124 not via the short-circuit part through conductor 131, and the second conductor C2 (lower surface conductor 122) of the pair of conductors is electrically connected to the second electrode 125 not via the short-circuit part through conductor 131, and the distance A1 from the first electrode 124 to the short-circuit part through conductor 131 is shorter than the distance A2 from the second electrode 125 to the short-circuit part through conductor 131.

According to this configuration, the connection point P1 where the first electrode 124 and the capacitance conductor 123 (radiation conductor) are connected can be easily provided closer to the short-circuit part through conductor 131 than the connection point P2 where the second electrode 125 and the lower surface conductor 122 (ground conductor) are connected is. That is, by a simple configuration in which the interlayer through conductors 133, 134 extending in the thickness direction of the insulating substrate 110 connect conductors, the distance A1 from the connection point P1 to the short-circuit part through conductor 131 can be made shorter than the distance A2 from the connection point P2 to the short-circuit part through conductor 131.

By the connection point P1 and the connection point P2 having this positional relationship, the section R, in which charges accumulate, of the capacitance element 140 can be made long. More specifically, by making the connection point P1, which is the end part position on the short-circuit part through conductor 131 side of the section R, closer to the short-circuit part through conductor 131, the section R can be made long. Thus, more charges accumulate on the capacitance element 140, and the potential difference generated between the conductors, which are a pair of conductors, of the capacitance element 140, can be larger. As a result, stronger radio waves can be emitted from the plate-like inverted-F antenna.

Further, because the connection point P2 where the second electrode 125 and the lower surface conductor 122 (ground conductor) are connected is close to the open end part 140a of the capacitance element 140, the potential (reference potential) on the lower surface conductor 122 side of the open end part 140a can be more stable. This can also make radio waves that are emitted from the plate-like inverted-F antenna stronger.

As described above, according to the configuration of this embodiment, stronger radio waves are emitted from the plate-like inverted-F antenna. Hence, even in the configuration in which the upper surface 110a of the insulating substrate 110 is sealed with the sealing member 300, the radio wave transmission distance, namely, the communication distance, can be longer.

Further, the distance B1 from the first electrode 124 to the capacitance part through conductor 132 is longer than the distance B2 from the second electrode 125 to the capacitance part through conductor 132. According to this configuration, the connection point P3 where the capacitance part through conductor 132 and the capacitance conductor 123 are connected can be greatly away from the connection point P1 where the first electrode 124 and the capacitance conductor 123 are connected. Hence, the section R having the connection point P1 and the connection point P3 as the ends can be longer. Thus, the potential difference generated between the conductors, which are a pair of conductors, of the capacitance element 140 can be larger, the intensity of the radio waves to be emitted can be higher, and the communication distance can be longer.

Further, the capacitance conductor 123 faces at least part of the lower surface conductor 122 to form the capacitance element 140, the first conductor C1 of the capacitance element 140 is the capacitance conductor 123 and the second conductor C2 thereof is the lower surface conductor 122, the first electrode 124 is electrically connected to the capacitance conductor 123 via the interlayer through conductor 133 that is disposed in layer(s) of the insulating substrate 110 between the first electrode 124 and the capacitance conductor 123, the second electrode 125 is electrically connected to the lower surface conductor 122 via the interlayer through conductor 134 that passes through the insulating substrate 110, and the distance A1 from the electrical connection point P1 on the capacitance conductor 123 with the first electrode 124 to the short-circuit part through conductor 131 is shorter than the distance A2 from the electrical connection point P2 on the lower surface conductor 122 with the second electrode 125 to the short-circuit part through conductor 131. Thus, a simple layer structure can make the section R long.

Further, the distance B1 from the electrical connection point P1 on the capacitance conductor 123 with the first electrode 124 to the capacitance part through conductor 132 is longer than the distance B2 from the electrical connection point P2 on the lower surface conductor 122 with the second electrode 125 to the capacitance part through conductor 132. Thus, a simple layer structure can make the section R longer.

Further, the RFID tag 10 of the above embodiment includes: the above-described RFID tag board 100; the RFID tag IC 200 that is mounted on the plate surface of the RFID tag board 100; and the sealing member 300 with which the plate surface of the RFID tag board 100 and the RFID tag IC 200 thereon are sealed. According to this configuration, even when sealing is performed by the sealing member 300, the communication distance can be longer.

Further the RFID system 1 of the above embodiment includes: the above-described RFID tag 10; and the reader/writer 2 that transmits and receives radio wave(s) to and from the RFID tag 10. According to this configuration, the RFID system 1 having a long communication distance between the RFID tag 10 and the reader/writer 2 can be realized.

Second Embodiment

Next, a second embodiment of the present disclosure will be described.

This embodiment is the same as the first embodiment except that the inner structure of the RFID tag board 100 is partly different from that in the first embodiment. Hereinafter, the same components as those of the first embodiment are denoted by the same reference signs, and detailed descriptions thereof are omitted.

Figure 7:
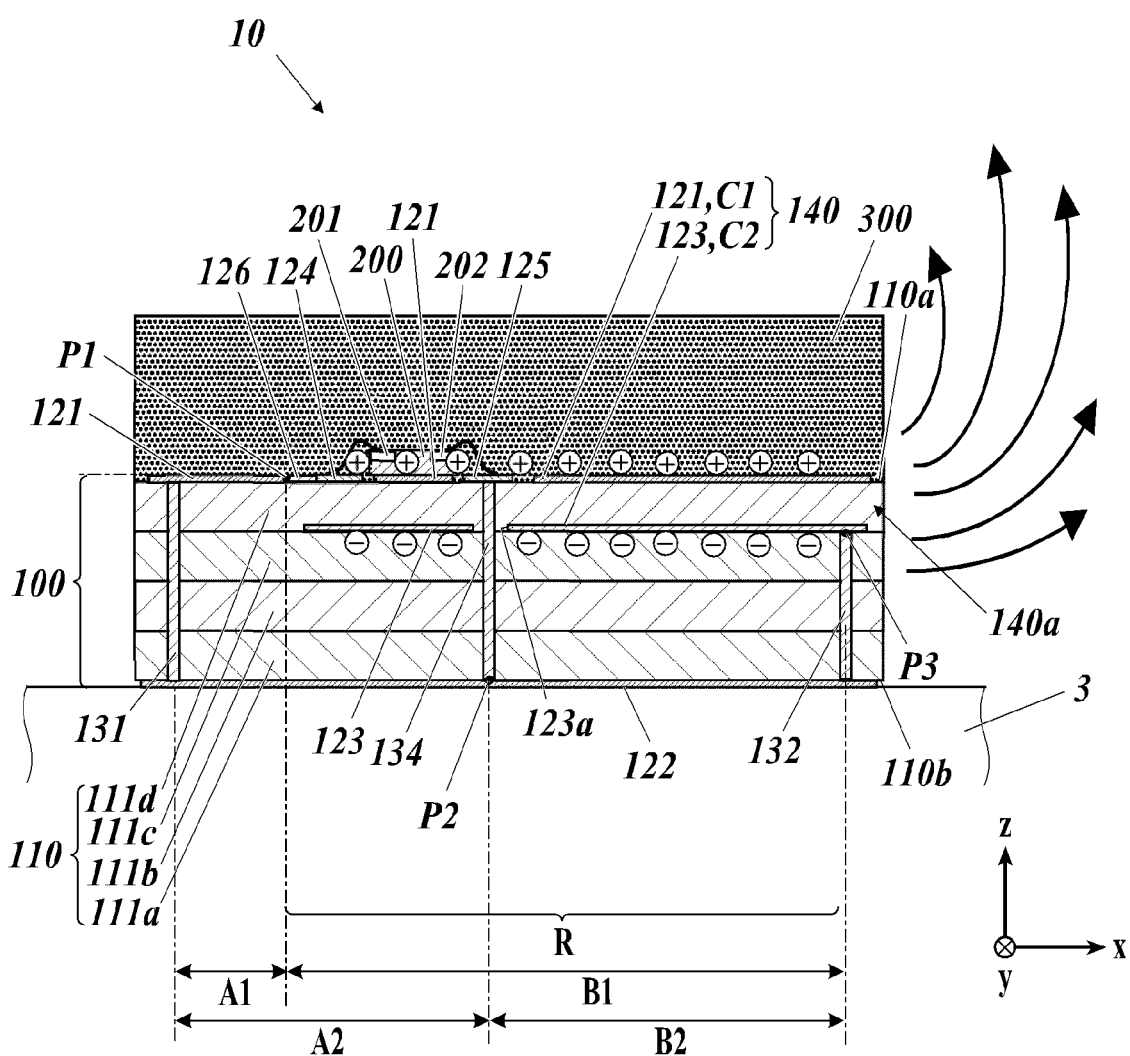
FIG. 7 is a sectional view showing the configuration of an RFID tag of a second embodiment.

FIG. 7 is a sectional view showing the configuration of the RFID tag 10 of the second embodiment.

Figure 8:
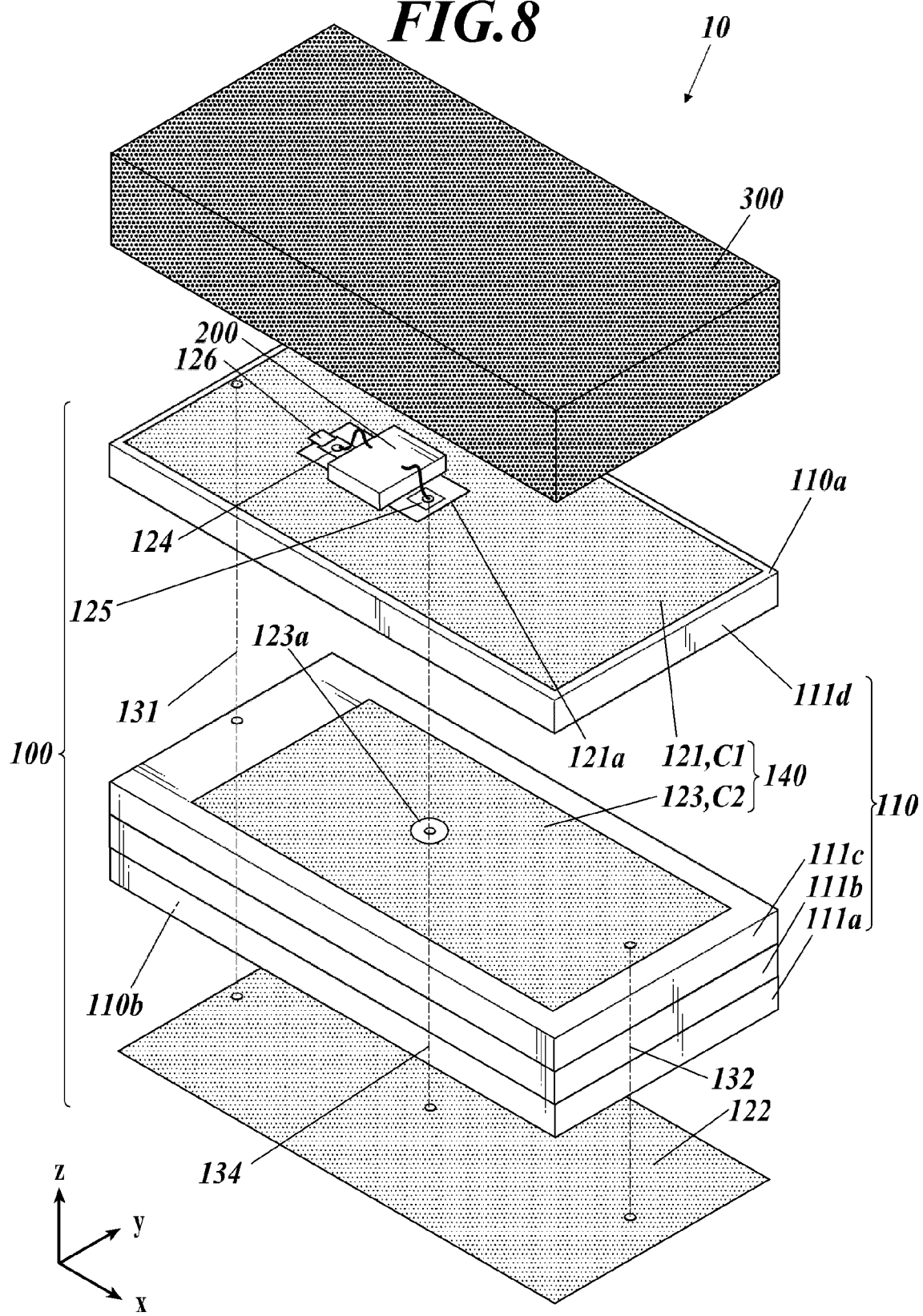
FIG. 8 is an exploded perspective view of the RFID tag shown in FIG. 7.

FIG. 8 is an exploded perspective view of the RFID tag 10 shown in FIG. 7.

As shown in FIG. 7 and FIG. 8, in the RFID tag board 100 of this embodiment, the capacitance conductor 123 faces part of the upper surface conductor 121 to form the capacitance element 140 together with the upper surface conductor 121. That is, the first conductor C1 of the capacitance element 140 is constituted by the upper surface conductor 121, and the second conductor C2 thereof is constituted by the capacitance conductor 123.

The capacitance part through conductor 132 is disposed in layers of the insulating substrate 110 between the capacitance conductor 123 and the lower surface conductor 122 (i.e. passes through the stacking substrates 111a to 111c in the z direction) to electrically connect the capacitance conductor 123 and the lower surface conductor 122.

The first electrode 124 is electrically connected to the upper surface conductor 121 by a connection electrode 126 disposed, of the upper surface 110a of the insulating substrate 110, in a region that connects the first electrode 124 and the upper surface conductor 121. Instead of this configuration, a configuration in which the first electrode 124 and the upper surface conductor 121 are directly connected or a configuration in which the first electrode 124 and the upper surface conductor 121 are integrated may be adopted.

Hence, in the RFID tag board 100 of this embodiment, the upper surface conductor 121 constitutes the radiation conductor of the plate-like inverted-F antenna, and the capacitance conductor 123, the capacitance part through conductor 132 and the lower surface conductor 122 constitute the ground conductor of the plate-like inverted-F antenna.

In this embodiment, the connection point where the connection electrode 126 and the upper surface conductor 121 are connected corresponds to the connection point P1, and the connection point where the interlayer through conductor 134 and the lower surface conductor 122 are connected corresponds to the connection point P2.

In this embodiment too, the distance A1 between the connection point P1 and the short-circuit part through conductor 131 is shorter than the distance A2 between the connection point P2 and the short-circuit part through conductor 131. Also, the distance B1 between the connection point P1 and the capacitance part through conductor 132 is longer than the distance B2 between the connection point P2 and the capacitance part through conductor 132.

<Effects of Embodiment>

As described above, in the RFID tag board 100 of the second embodiment, the capacitance conductor 123 faces at least part of the upper surface conductor 121 to form the capacitance element 140. According to this configuration, as shown in FIG. 7, the position of the open end part 140a of the pair of the conductors of the capacitance element 140 (i.e. a position where radio waves are mainly emitted from the plate-like inverted-F antenna) can be close to the sealing member 300. More specifically, the position where radio waves are emitted can be immediately below the sealing member 300. Radio waves emitted from this position in the +x direction hardly enter the sealing member 300 because the distance from the position to the sealing member 300 is extremely short. This is because radio waves require some space to turn their traveling direction (i.e. because radio waves cannot turn sharply in a narrow space). As a result, the emitted radio waves are hardly affected by the sealing member 300, and hence the communication distance can be longer.

Further, the first conductor C1 is the upper surface conductor 121 and the second conductor C2 is the capacitance conductor 123, the second electrode 125 is electrically connected to the lower surface conductor 122 via the second interlayer through conductor that passes through the insulating substrate 110, and the distance A1 from the electrical connection point P1 on the upper surface conductor 121 with the first electrode 124 to the short-circuit part through conductor 131 is shorter than the distance A2 from the electrical connection point P2 on the lower surface conductor 122 with the second electrode 125 to the short-circuit part through conductor 131. Thus, a simple layer structure can make the section R, in which charges accumulate, of the capacitance element 140 longer. More specifically, by making the connection point P1, which is the end part position on the short-circuit part through conductor 131 side of the section R, closer to the short-circuit part through conductor 131, the section R can be made long. Thus, the potential difference generated between the conductors, which are a pair of conductors, of the capacitance element 140 can be larger, the intensity of the radio waves to be emitted can be higher, and the communication distance can be longer.

Further, the distance B1 from the electrical connection point P1 on the upper surface conductor 121 with the first electrode 124 to the capacitance part through conductor 132 is longer than the distance B2 from the electrical connection point P2 on the lower surface conductor 122 with the second electrode 125 to the capacitance part through conductor 132. Thus, the connection point P3 where the capacitance part through conductor 132 and the lower surface conductor 122 are connected can be greatly away from the connection point P1 where the first electrode 124 and the capacitance conductor 123 are connected. Thus, a simple layer structure can make the section R longer.

Third Embodiment

Next, a third embodiment of the present disclosure will be described.

This embodiment is the same as the second embodiment except that the connection point P2 where the second electrode 125 and the ground conductor are connected is different from that in the second embodiment. Hereinafter, the same components as those of the second embodiment are denoted by the same reference signs, and detailed descriptions thereof are omitted.

Figure 9:
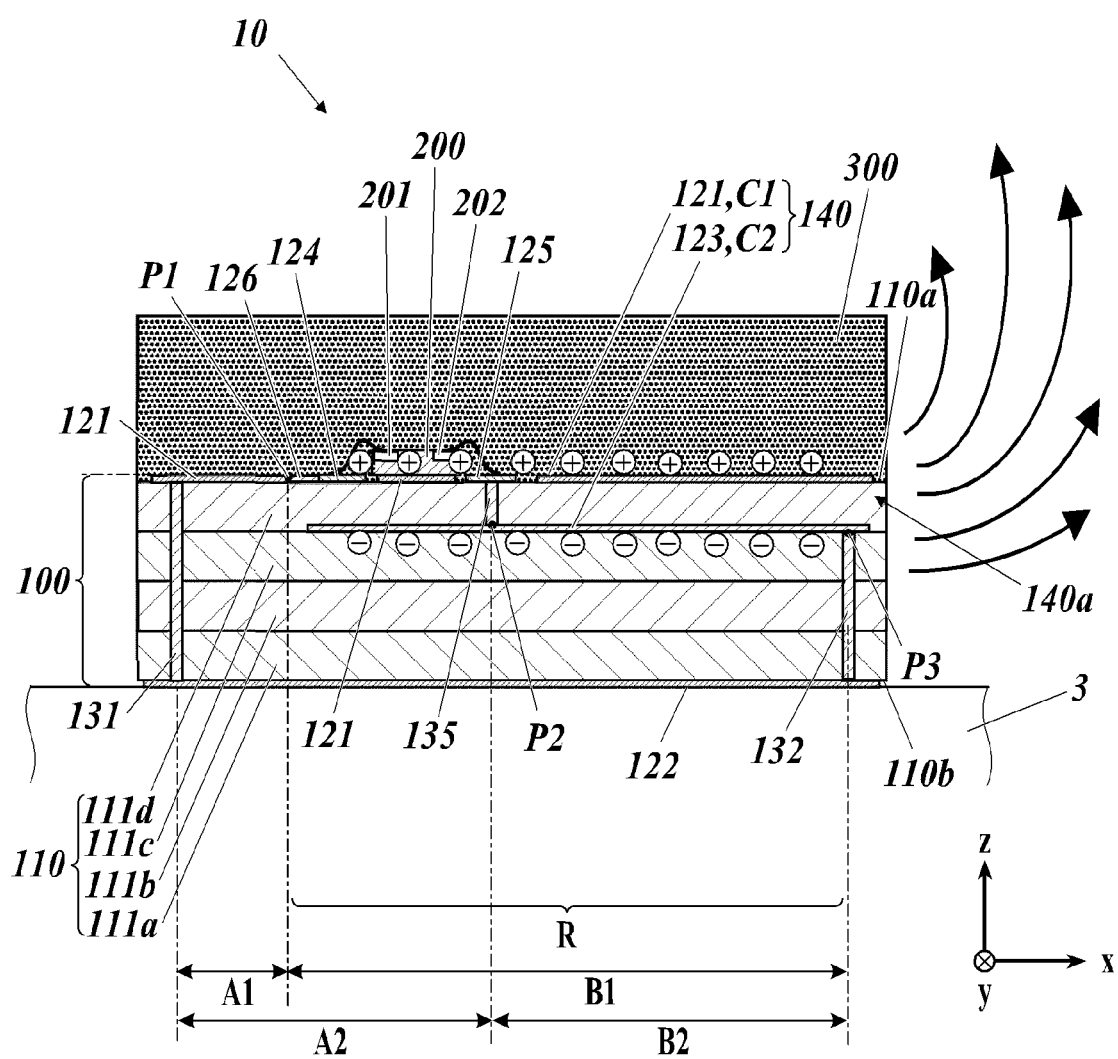
FIG. 9 is a sectional view showing the configuration of an RFID tag of a third embodiment.

FIG. 9 is a sectional view showing the configuration of the RFID tag 10 of the third embodiment.

Figure 10:
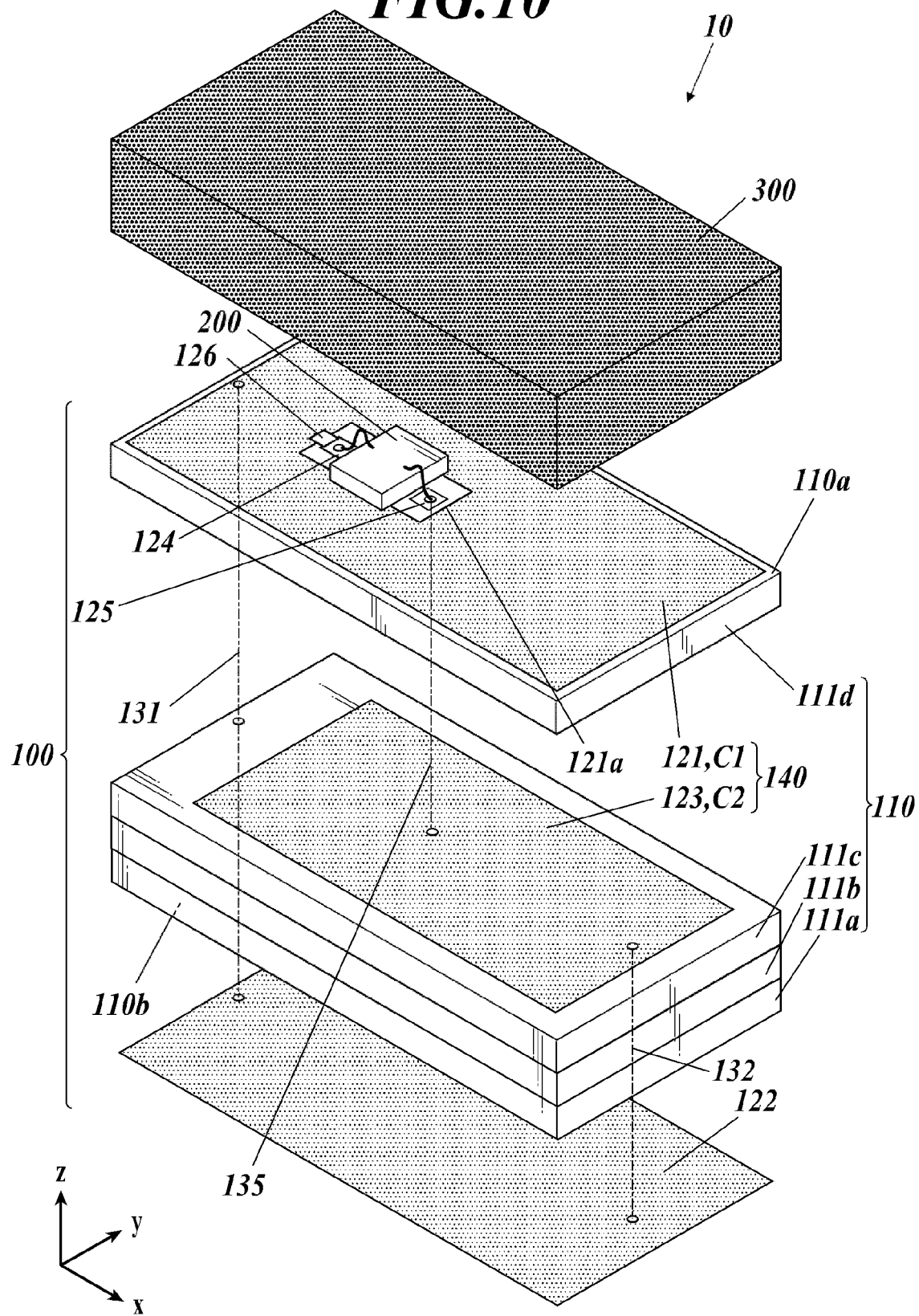
FIG. 10 is an exploded perspective view of the RFID tag shown in FIG. 9.

FIG. 10 is an exploded perspective view of the RFID tag 10 shown in FIG. 9.

As shown in FIG. 9 and FIG. 10, in the RFID tag board 100 of this embodiment, the capacitance conductor 123 is electrically connected to the second electrode 125 by an interlayer through conductor 135 (third interlayer through conductor). The interlayer through conductor 135 is disposed in a layer of the insulating substrate 110 between the second electrode 125 and the capacitance conductor 123 (i.e. passes through the stacking substrate 111d in the z direction). The interlayer through conductor 135 is disposed so as to be superposed on the second electrode 125 when viewed in the z direction.

In this embodiment, the connection point where the interlayer through conductor 135 and the capacitance conductor 123 are connected corresponds to the connection point P2, and the connection point P1 is the same as that in the second embodiment.

In this embodiment having such a configuration too, the distance A1 between the connection point P1 and the short-circuit part through conductor 131 is shorter than the distance A2 between the connection point P2 and the short-circuit part through conductor 131. Also, the distance B1 between the connection point P1 and the capacitance part through conductor 132 is longer than the distance B2 between the connection point P2 and the capacitance part through conductor 132.

<Effects of Embodiment>

As described above, in the RFID tag board 100 of the third embodiment, the first conductor C1 is the upper surface conductor 121 and the second conductor C2 is the capacitance conductor 123, the second electrode 125 is electrically connected to the capacitance conductor 123 via the third interlayer through conductor that is disposed in a layer of the insulating substrate 110 between the second electrode 125 and the capacitance conductor 123, and the distance A1 from the electrical connection point P1 on the upper surface conductor 121 with the first electrode 124 to the short-circuit part through conductor 131 is shorter than the distance A2 from the electrical connection point P2 on the capacitance conductor 123 with the second electrode 125 to the short-circuit part through conductor 131.

With this configuration too, a simple layer structure can make the section R, in which charges accumulate, of the capacitance element 140 longer. More specifically, by making the connection point P1, which is the end part position on the short-circuit part through conductor 131 side of the section R, closer to the short-circuit part through conductor 131, the section R can be made long. Thus, the potential difference generated between the conductors, which are a pair of conductors, of the capacitance element 140 can be larger, the intensity of the radio waves to be emitted can be higher, and the communication distance can be longer.

Further, in the configuration of this embodiment, as shown in FIG. 9, in a region between the capacitance element 140 and the lower surface conductor 122 (which is hereinafter referred to as an "under-layer region" of the capacitance element 140), no conductor electrically connected to the first electrode 124 or the second electrode 125 is present. Hence, it hardly occurs that charges accumulate in the under-layer region due to the potential difference between the first electrode 124 and the second electrode 125, and hence an unnecessary electric field cannot be generated in the under-layer region. As a result, charges can accumulate on the first conductor C1 (upper surface conductor 121) and the second conductor C2 (capacitance conductor 123) of the capacitance element 140 intensively, and hence strong radio waves can be emitted from the open end part 140a of the capacitance element 140 intensively. Thus, the communication distance can be longer.

Further, the distance B1 from the electrical connection point P1 on the upper surface conductor 121 with the first electrode 124 to the capacitance part through conductor 132 is longer than the distance B2 from the electrical connection point P2 on the capacitance conductor 123 with the second electrode 125 to the capacitance part through conductor 132. Thus, the connection point P3 where the capacitance part through conductor 132 and the lower surface conductor 122 are connected can be greatly away from the connection point P1 where the first electrode 124 and the capacitance conductor 123 are connected. Thus, a simple layer structure can make the section R longer.

Simulations of antenna gain were conducted about the RFID tag 10 of the first embodiment shown in FIG. 3 and FIG. 4 and the RFID tag 10 of the third embodiment shown in FIG. 9 and FIG. 10. The antenna gain of the RFID tag 10 of the first embodiment was −26.33 dBi, and the antenna gain of the RFID tag 10 of the third embodiment was −23.78 dBi. That is, an improvement of about 2.5 dBi was observed. This confirms that the communication distance in the configuration of the third embodiment is improved to about 1.5 times longer than the communication distance in the configuration of the first embodiment. This is an effect obtained from the facts that, in the RFID tag 10 shown in FIG. 9 and FIG. 10, the capacitance conductor 123 faces the upper surface conductor 121, the capacitance element 140 is disposed immediately below the sealing member 300 (i.e. radio waves radiate from immediately below the sealing member 300), and electrical connection between the second electrode 125 and the ground conductor is performed by the interlayer through conductor 135 that passes through the layer between the second electrode 125 and the capacitance conductor 123 only.

The present disclosure is not limited to the above-described embodiments, and various modifications can be made.

For example, in the above embodiments, the capacitance conductor 123 faces part of the upper surface conductor 121 or part of the lower surface conductor 122, but is not limited thereto. The capacitance conductor 123 may face the entire upper surface conductor 121 or the entire lower surface conductor 122.

Further, in the above embodiments, the RFID tag board 100 is a rectangular parallelepiped that is long in the x direction, but is not limited thereto. The RFID tag board 100 may be square when viewed in the z direction or long in the y direction.

Further, in the above embodiments, the insulating substrate 110 is composed of the four stacking substrates 111a to 111d, but is not limited thereto. The insulating substrate 110 may be composed of three or less stacking substrates or five or more stacking substrates.

INDUSTRIAL APPLICABILITY

The present disclosure is applicable to an RFID tag board, an RFID tag and an RFID system.

The invention claimed is:

1. An RFID tag board having a plate surface on which a semiconductor integrated circuit is to be mounted, comprising:
an insulating substrate one surface of which forms the plate surface;
a first surface conductor that is disposed on the one surface of the insulating substrate;
a second surface conductor that is disposed on a surface of the insulating substrate opposite to the one surface;
a short-circuit part through conductor that passes through the insulating substrate in a thickness direction to electrically connect the first surface conductor and the second surface conductor;
a capacitance conductor that is disposed in the insulating substrate and faces at least part of the first surface conductor to form a capacitance element;
a second electrode that is disposed on the one surface of the insulating substrate and is electrically connected to the capacitance conductor not via the short-circuit part through conductor; and a capacitance part through conductor that is disposed in the insulating substrate to electrically connect the capacitance conductor and the second surface conductor.

2. The RFID tag board according to claim 1, further comprising an interlayer through conductor that passes through the insulating substrate in the thickness direction to electrically connect the second electrode and the second surface conductor.

3. The RFID tag board according to claim 2, wherein the interlayer through conductor passes through an opening provided in the capacitance conductor.

4. The RFID tag board according to claim 2, further comprising a first electrode that is disposed on the one surface and is electrically connected, on the one surface, to the first surface conductor,
wherein a distance from an electrical connection point on the first surface conductor with the first electrode to the short-circuit part through conductor is shorter than a distance from an electrical connection point on the second surface conductor with the interlayer through conductor to the short-circuit part through conductor.

5. The RFID tag board according to claim 3, further comprising a first electrode that is disposed on the one surface and is electrically connected, on the one surface, to the first surface conductor,
wherein a distance from an electrical connection point on the first surface conductor with the first electrode to the short-circuit part through conductor is shorter than a distance from an electrical connection point on the second surface conductor with the interlayer through conductor to the short-circuit part through conductor.

6. The RFID tag board according to claim 1, further comprising an interlayer through conductor that is disposed in a layer of the insulating substrate between the second electrode and the capacitance conductor to electrically connect the second electrode and the capacitance conductor.

7. The RFID tag board according to claim 6, further comprising a first electrode that is disposed on the one surface and is electrically connected, on the one surface, to the first surface conductor,
wherein a distance from an electrical connection point on the first surface conductor with the first electrode to the short-circuit part through conductor is shorter than a distance from an electrical connection point on the capacitance conductor with the interlayer through conductor to the short-circuit part through conductor.

8. The RFID tag board according to claim 1, wherein an area where the capacitance conductor faces the first surface conductor is continuous from (i) a side of the second electrode opposite to a side thereof where the short-circuit part through conductor is provided to (ii) the side thereof where the short-circuit part through conductor is provided.

9. The RFID tag board according to claim 1, wherein the capacitance part through conductor is connected to, of the capacitance conductor, an end opposite to an end where the short-circuit part through conductor is provided.

10. An RFID tag comprising:
the RFID tag board according to claim 1;
the semiconductor integrated circuit that is mounted on the plate surface of the RFID tag board; and
a sealing member with which the plate surface of the RFID tag board and the semiconductor integrated circuit thereon are sealed.

11. An RFID system comprising:
the RFID tag according to claim 10; and
a reader/writer that transmits and receives a radio wave to and from the RFID tag.

* * * * *